United States Patent
Kim

(10) Patent No.: US 9,013,131 B2
(45) Date of Patent: Apr. 21, 2015

(54) REAL-TIME SERVO MOTOR CONTROLLER BASED ON A LOAD WEIGHT

(75) Inventor: Ki Hong Kim, Gyeongsangnam-Do (KR)

(73) Assignee: Doosan Infracore Co., Ltd., Incheon (KR)

( * ) Notice: Subject to any disclaimer, the term of this patent is extended or adjusted under 35 U.S.C. 154(b) by 162 days.

(21) Appl. No.: 13/992,147

(22) PCT Filed: Dec. 8, 2011

(86) PCT No.: PCT/KR2011/009486
§ 371 (c)(1),
(2), (4) Date: Jun. 6, 2013

(87) PCT Pub. No.: WO2012/077996
PCT Pub. Date: Jun. 14, 2012

(65) Prior Publication Data
US 2013/0257339 A1    Oct. 3, 2013

(30) Foreign Application Priority Data
Dec. 10, 2010    (KR) .................. 10-2010-0126215

(51) Int. Cl.
G05B 13/00    (2006.01)
G05B 13/02    (2006.01)
H02P 21/14    (2006.01)
H02P 23/14    (2006.01)

(52) U.S. Cl.
CPC .......... *G05B 13/0245* (2013.01); *H02P 21/143* (2013.01); *H02P 23/14* (2013.01)

(58) Field of Classification Search
USPC ............ 318/561, 600, 610, 630, 560, 400.33, 318/490, 432
See application file for complete search history.

(56) References Cited

U.S. PATENT DOCUMENTS

| | | | |
|---|---|---|---|
| 6,998,812 B2 | 2/2006 | Kerner et al. | |
| 2013/0057191 A1* | 3/2013 | Yoshiura et al. | 318/600 |

FOREIGN PATENT DOCUMENTS

| | | |
|---|---|---|
| JP | 07-141001 A | 6/1995 |
| JP | 08-263143 A | 10/1996 |
| JP | 2000-020104 A | 1/2000 |
| JP | 2005-006418 A | 1/2005 |
| JP | 2008-206331 A | 9/2008 |
| JP | 2010-148178 A | 7/2010 |
| KR | 100185720 | 5/1999 |
| KR | 100712558 | 4/2007 |
| KR | 10-2009-0073254 A | 7/2009 |

OTHER PUBLICATIONS

Search Report date May 16, 2012 and written in Korean with English translation attached for International Patent Application No. PCT/KR2011/009486 filed Dec. 8, 2011, 5 pages.

* cited by examiner

*Primary Examiner* — Karen Masih
(74) *Attorney, Agent, or Firm* — John D. Veldhuis-Kroeze; Westman, Champlin & Koehler, P.A.

(57) ABSTRACT

The present disclosure relates to a real-time servo motor controller based on a load weight capable of not only adaptively controlling the servo motor even when load inertia varies in accordance with a weight of a load (material) but also controlling the servo motor in an optimum state regardless of the load weight by reflecting in real time various mechanical variables generated while transferring the load.

6 Claims, 4 Drawing Sheets

| TABLE INDEX | LOAD INERTIA | CONTROL PARAMETER |
|---|---|---|
| 0 | $m_0$ | $f_0$ |
| ⋮ | ⋮ | ⋮ |
| 3 | $m_3$ | $f_3$ |
| 4 | $m_4$ | $f_4$ |
| ⋮ | ⋮ | ⋮ |
| n | $m_n$ | $f_n$ |

REAL-TIME SERVO MOTOR CONTROLLER BASED ON A LOAD WEIGHT

CROSS-REFERENCE TO RELATED APPLICATION

This Application is a Section 371 National Stage Application of International Application No. PCT/KR2011/009486, filed Dec. 8, 2011 and published, not in English, as WO2012/077996 on Jun. 14, 2012.

FIELD OF THE DISCLOSURE

The present disclosure relates to a real-time servo motor controller based on a load weight, and more particularly, to a real-time servo motor controller based on a load weight capable of not only adaptively controlling the servo motor even when load inertia varies in accordance with a weight of a load (material) but also controlling the servo motor in an optimum state regardless of the load weight by reflecting in real time various mechanical variables generated while transferring the load.

BACKGROUND OF THE DISCLOSURE

In general, a plant including various types of machine tools transfers a material (a load), which are loaded in the plant, by using a servo motor, and at this time performance of a control system is greatly affected by load inertia according to a weight of the load, which is applied to the servo motor and a transfer shaft connected thereto.

Particularly, in a case in which a pitch of a transfer shaft ball screw is increased in order to reduce a cycle time and increase a transfer velocity, because an effect of reduction ratio by the ball screw is decreased, a change in load inertia becomes larger in accordance with a change in load weight, and thereby performance of the control system is greatly varied.

That is, not only bandwidth of the control system but also stability of the control system is affected by a relative ratio between inertia of the servo motor and load inertia seen from the corresponding servo motor. In general, as an inertia ratio of the load to the servo motor becomes small, the bandwidth of the control system becomes increased and stability of the control system becomes high, and in contrast, as the inertia ratio of the load to the servomotor becomes high, the bandwidth of the control system becomes decreased and stability of the control system deteriorates.

Further, since there are problems in that as the bandwidth of the control system becomes decreased, a delay between a transfer command and a following is increased because responsiveness to the command deteriorates, and as stability deteriorates, a following overshoot is increased, the problems, which are expected to occur need to be avoided by adjusting an appropriate control parameter, and therefore it is necessary to estimate the load inertia according to the load weight in real time.

To this end, "Inertia Estimating Controller and Control System (Japanese Patent Application Laid-Open No. 2010-148178)" of which an applicant is Fanuc Ltd. in Japan suggests a method in which if a sine torque command is transmitted to a transfer shaft servo motor in accordance with an inertia estimation start signal, load inertia is calculated by detecting an electric current and acceleration data of the servo motor when the servo motor vibrates by the torque command.

However, because the aforementioned method uses a method of vibrating the transfer shaft servo motor by generating the inertia estimation start signal every time a load is changed, and setting a parameter by measuring friction of a transfer shaft in advance, the method does not cope in real time with a change in friction property of the transfer shaft according to a load weight and an elapsed time, and as a result, there is a problem in that it is difficult to estimate the inertia or an estimation error becomes large in a case in which connection stiffness between the servo motor and the transfer shaft deteriorates due to a mechanical backlash.

In addition, "Method for Determining the Mass Moment of Inertia of an Electric Motor Drive System (U.S. Pat. No. 6,998,812)" of which an assignee is Dr. Johannes Heidenhain Gmbh in Germany suggests a method of estimating load inertia by transferring a material transfer shaft in all forward and reverse directions.

However, the aforementioned method degrades estimation performance of the load inertia due to a ripple of torque and acceleration data of a servo motor, which may occur by transfer shaft compliance at the time of turning the directions, and fails to reflect in real time a change in frictional force (that is, disturbance) even though frictional force of a transfer system in a constant velocity section and frictional force in an acceleration section are different from each other, and as a result, there is a problem in that calculation accuracy of the load inertia deteriorates.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure has been made in an effort to provide a real-time servo motor controller based on a load weight capable of not only adaptively controlling the servo motor even when load inertia varies in accordance with a weight of a load (material) but also controlling the servo motor in an optimum state regardless of the load weight by reflecting in real time various mechanical variables generated while transferring the load.

To this end, a real-time servo motor controller based on a load weight according to the present disclosure may include: a control parameter provider which respectively stores control parameters for controlling a servo motor, which are optimized by using various data measured while transferring loads (materials) for tests, respectively, which have different weights, and then provides the control parameter corresponding to the load inertia estimated in real time when a plant is actually operated; a disturbance observer which estimates in real time disturbance including frictional torque, which is generated while rapidly transferring the load; a load inertia calculator which calculates inertia of the load, which is being transferred by the servo motor, by receiving a measured value of an electric current applied to the servo motor, a measured value of a rotating angular velocity of the servo motor, and an estimation disturbance value estimated by the disturbance observer, and outputs the calculated load inertia value to the control parameter provider; a servo controller which receives from the control parameter provider the control parameter corresponding to the load inertia outputted by the load inertia calculator, and controls the servo motor by using the inputted control parameter; and a high level controller which performs calculation of the load inertia and a control algorithm of the servo controller through the control parameter.

Here, the control parameter provider may store the tested control parameter in a look-up table for each load inertia according to a weight of each load, and may provide the control parameter by linearly interpolating two control parameter values which are adjacent to each other among the control parameter values stored in the look-up table.

In addition, the load inertia calculator may calculate the load inertia in real time by using the following Equation 1, and may output the calculated load inertia to the control parameter provider.

$$\int K_t \times (I_q + DTRQ) dt = (J_m + J_L) \times V_m \quad \text{[Equation 1]}$$

(Here, $K_t$ is a servo motor torque constant, $I_q$ is a q-phase current applied to the servo motor, DTQR is disturbance, $V_m$ is a rotating angular velocity of the servo motor, $J_m$ is servo motor inertia, and $J_L$ is load inertia seen from the motor)

In addition, the control parameter, the disturbance, and the load inertia may be estimated by values measured while the load is transferred by the servo motor at constant acceleration.

According to the real-time servo motor controller based on a load weight according to the present disclosure, the servo motor may be adaptively controlled even in a case in which the load inertia is changed in accordance with weights of loads (materials).

In addition, the real-time servo motor controller based on a load weight may control the servo motor in an optimum state regardless of the load weight by reflecting in real time various mechanical variables such as a mechanical backlash and frictional torque, which are generated while transferring the load.

DESCRIPTION OF MAIN REFERENCE NUMERALS OF DRAWINGS

Figure 1:
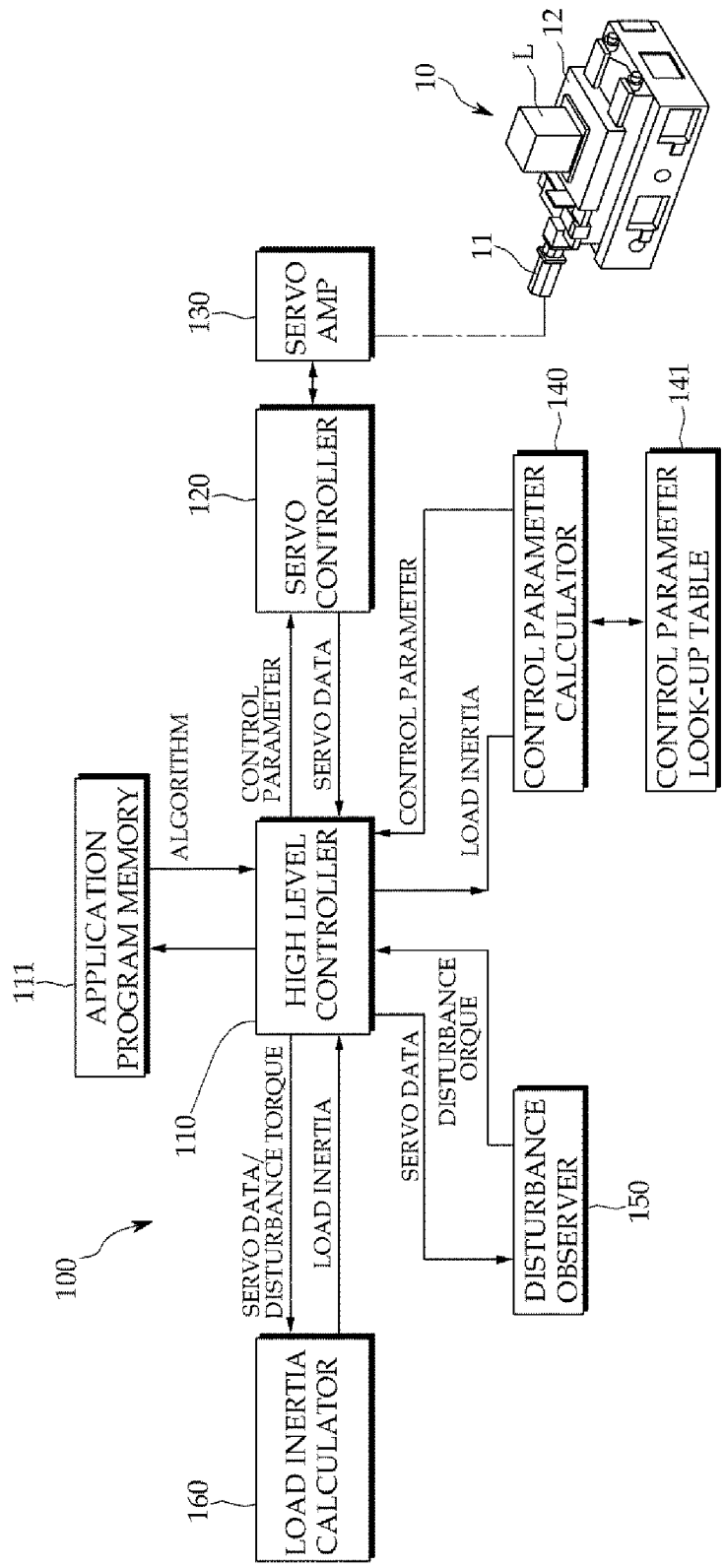
FIG. 1 is a schematic diagram illustrating a real-time servo motor controller based on a load weight of the present disclosure.

110: High level controller
111: Application program memory
120: Servo controller
130: Servo amp
140: Control parameter provider
141: Look-up table
150: Disturbance observer
160: Load inertia calculator
10: Plant
11: Servo motor
12: Work table
L: Load (material)

DETAILED DESCRIPTION

Hereinafter, a real-time servo motor controller based on a load weight according to an exemplary embodiment of the disclosure will be described in detail with reference to the accompanying drawings.

First, as illustrated in FIG. 1, a real-time servo motor controller 100 based on a load weight according to an embodiment of the disclosure includes a control parameter provider 140 which stores control parameters, respectively, optimized by using various data measured while transferring loads (materials) for tests, respectively, and provides a control parameter corresponding to load inertia estimated in real time, a disturbance observer 150 which estimates in real time disturbance which occurs while transferring a load L (hereinafter, the reference numeral will be omitted), a load inertia calculator 160 which calculates inertia of the load which is being transferred and outputs the calculation result to the control parameter provider 140, a servo controller 120 which controls a servo motor 11 by receiving the control parameter from the control parameter provider 140, and a high level controller 110 which adjusts a control algorithm.

In addition, as publicly known, a servo amp 130 (also called "servo driver") including an IGBT (insulated gate bipolar transistor), or the like is provided between the servo controller 120 and a plant 10 in order to convert a PWM signal into an exciting current and supply the converted exciting current to the servo motor 11.

According to the aforementioned configuration, when the disturbance observer 150 estimates in real time the disturbance which occurs while transferring the load by using the servo motor 11, and an electric current value applied to the servo motor 11 and a rotating angular velocity of the servo motor 11 are measured by a sensor (not illustrated) mounted in the servo motor, the load inertia, which occurs by the load which is being transferred, may be calculated by the load inertia calculator 160 by using the disturbance, the electric current value, and the rotating angular velocity.

Further, the control parameter provider 140 provides a control parameter, which corresponds to the calculated load inertia among the control parameters already stored, to the servo controller 120, thereby allowing the servo controller 120 to control the servo motor 11 by using the provided control parameter, and in this case, the aforementioned control system is operated under a control of the high level controller 110.

Therefore, in the present disclosure, the load inertia is calculated by detecting the disturbance, and the electric current and acceleration data during a rapid transfer which may easily collect data and secure a sufficient time because of a high acceleration and deceleration time constant, and the control parameter of the control system for the servo motor transfer shaft is adaptively adjusted in accordance with the calculated load inertia, thereby enabling optimum transfer shaft control regardless of the load weight.

Here, the rapid transfer means a velocity equal to or greater than a predetermined velocity, at which the load inertia according to the load weight affects the overall control system, and because this may be changed in accordance with a weight of the load, a rapid transfer reference value may be variably set in accordance with the load weight.

In addition, according to the present disclosure, the servo data detected in real time while transferring the load is used, thereby removing an influence of a mechanical backlash which occurs at the time of reversing the load transfer shaft, and coping with a change in friction property, which occurs during the transfer, by considering the disturbance data.

In addition, according to the present disclosure, because the control parameters with respect to loads for tests, which have different weights, are stored in advance and then provided, the load inertia is calculated by reflecting in real time the disturbance applied to the transfer shaft of the servo motor 11, and the optimized control parameter corresponding to the calculated load inertia is selectively provided, without performing an explicit procedure in which an equipment operator generates a load inertia estimation start signal every time the load is changed, thereby reducing a burden of the equipment operator.

More specifically, the control parameter provider 140 respectively stores the control parameters for controlling the servo motor 11, which are optimized by using various data measured while transferring the loads for tests, respectively, which have different weights, and then calculates and provides the control parameter corresponding to the load inertia estimated in real time when the plant 10 is actually operated.

Examples of the loads for tests include the loads having representative weights of no-load (that is, 0 ton), 2.5 tons, 5 tons, 7.5 tons, 10 tons, and the like, or a larger number of loads for tests may be used when necessary, and control parameter values, which may optimally correspond to the load inertia, are obtained in advance and then stored after loading the loads for tests on a work table 12 of the plant 10.

Figures 2A, 2B:
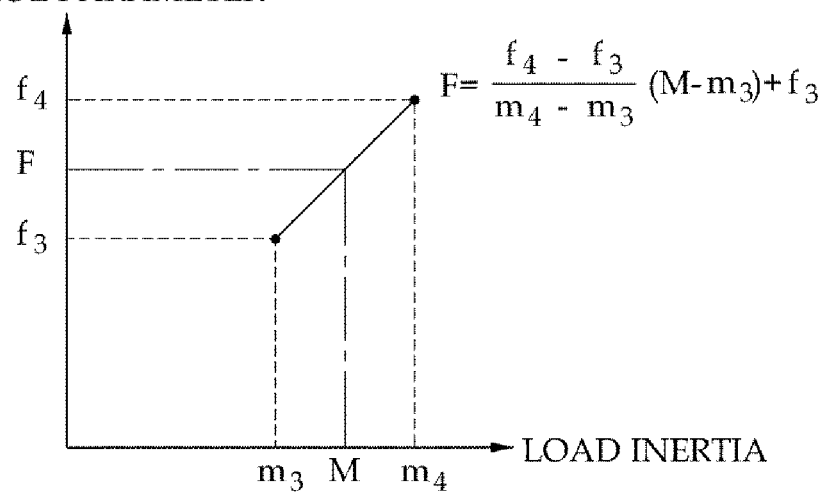
FIG. 2a is a view illustrating a look-up table of the real-time servo motor controller based on the load weight of the present disclosure.
FIG. 2b is a view illustrating a linear interpolation method of the real-time servo motor controller based on the load weight of the present disclosure.

As illustrated in FIG. 2a, the control parameter with respect to each of the loads for tests is stored in a look-up table 141, the look-up table 141 provided in an Inactive memory includes a table index, the load inertia, the control parameter, and the like, and therefore optimum control parameters are stored for each of the loads for tests, which have different weights.

As publicly known, the control parameter includes a velocity loop control gain, acceleration and deceleration time constant, an attenuation frequency of a resonance elimination filter, an acceleration feedback gain, and an acceleration feed forward.

Here, as a value of the velocity loop control gain becomes large, control stiffness and responsiveness become improved, but if the value of the velocity loop control gain is excessively large, the control loop becomes unstable.

In addition, as a value of the acceleration and deceleration time constant become large, impact due to the load inertia becomes small, but a processing time is increased.

In addition, because a resonance frequency is changed in accordance with an inertia ratio between the servo motor 11 and the load and stiffness of the transfer system, a center frequency of the resonance elimination (vibration elimination) filter needs to be adjusted in order to adaptively cope with the change in the resonance frequency.

In addition, the acceleration feedback gain is a parameter which electronically adjusts the inertia of the servo motor 11, as a value of the acceleration feedback gain becomes large, a problem, which occurs when the load inertia is greater than the servo motor inertia, is improved but a processing time is increased, and if the value of the acceleration feedback gain is excessively large, the control system becomes unstable.

In addition, the acceleration feed forward is a parameter for compensating for a delay which occurs due to the load inertia, as a value of the acceleration feed forward becomes large, the acceleration and deceleration is increased, but if the value of the acceleration feed forward is excessively large, an impact due to the load inertia may occur.

Therefore, the aforementioned various control parameters are tested for each of the loads for tests, and the optimum control parameters are measured in advance and stored.

Meanwhile, in a case in which the estimated load inertia M is smaller than minimum load inertia $m_0$ that is already stored in the look-up table 141 (M≤$m_0$), a control parameter $f_0$, which corresponds to the minimum load inertia $m_0$ that is already stored in the look-up table 141, is provided as a control parameter $f_M$ to be provided, and in contrast, in a case in which the estimated load inertia M is larger than maximum load inertia $m_n$ that is already stored in the look-up table 141 (M≥$m_n$), a control parameter $f_n$, which corresponds to the maximum load inertia $m_n$ that is already stored in the look-up table 141, is provided as a control parameter $f_M$ to be provided.

That is, a value out of the range of the look-up table 141 is provided by being substituted with a minimum value $f_0$ or a maximum value $f_n$ of the look-up table 141, thereby appropriately coping even with a case in which a representative value is not present in the look-up table 141. The reason is that the control is actually not greatly affected even though a value out of the range, which is smaller than the minimum value $f_0$ or larger than the maximum value $f_n$, is substituted with the minimum value $f_0$ or the maximum value $f_n$.

In addition, in a case in which a control parameter needs to be provided with respect to a load having a weight which is not out of the range of the look-up table 141 but is not the representative weight, the control parameter is provided by using a linear interpolation method, as illustrated in FIG. 2b.

That is, the control parameter is provided by linearly interpolating two control parameter values which are adjacent to each other among the control parameter values stored in the look-up table 141, and for example, in a case in which the load inertia of the actual load is calculated to a value between $m_3$ and $m_4$, the control parameter calculated by using an equation $F=(f_4-f_3/m_4-m_3)*(M-m_3)+f_3$ is provided.

The present disclosure stores in advance the control parameters that are optimized for the loads for tests, which have different representative weights through the aforementioned process, and then provides the control parameters appropriate to the various loads.

Therefore, as described below in more detail, when disturbance is estimated in real time by the disturbance observer 150, the load inertia is calculated by using the disturbance and various servo data, the control parameter already stored in the look-up table 141 may be immediately used in accordance with the load inertia, and as a result, it is not necessary to perform an explicit procedure in which an equipment operator generates a load inertia estimation start signal every time the load is changed like the related art.

Figure 3:
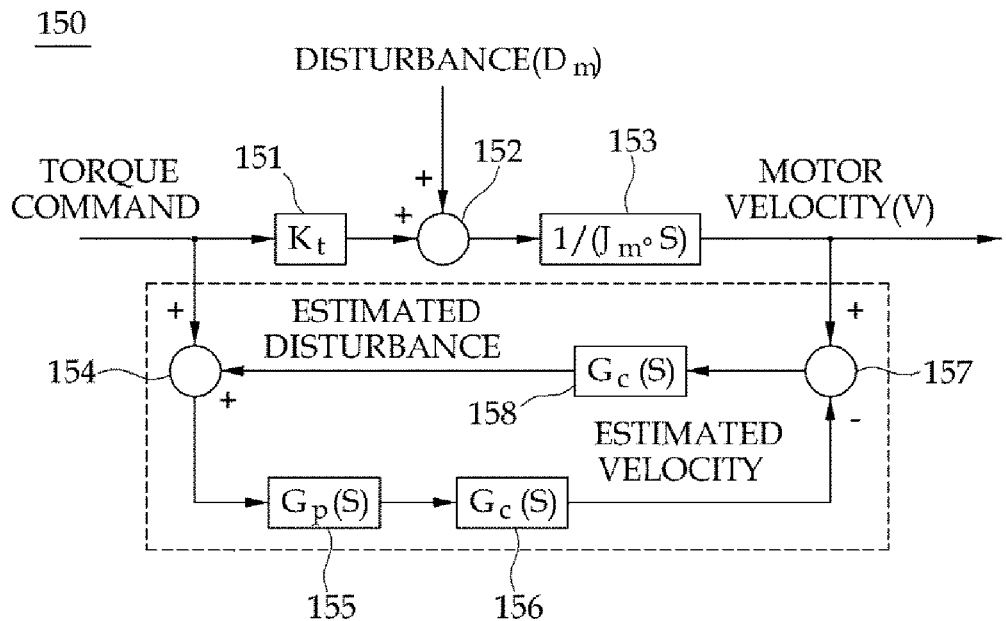
FIG. 3 is a block diagram illustrating a disturbance observer of the real-time servo motor controller based on the load weight of the present disclosure.

The disturbance observer 150 estimates in real time the disturbance including frictional torque of the transfer shaft and force applied from the outside while transferring the load, provides the disturbance to the load inertia calculator 160, includes motor units 151 and 153, a disturbance adder 152, an estimation disturbance adder 154, a transfer shaft inertia model 155, a velocity sensor model 156, a velocity subtractor 157, and a compensator 158, as illustrated in FIG. 3, which form a closed loop feedback control circuit.

In FIG. 3, Kt of the motor units 151 and 153 is a motor torque constant, Jm is motor inertia, and these are indicated in a specification of the servo motor 11, which is provided by a manufacturer of the servo motor 11. S is a Laplace operator.

In addition, the disturbance adder 152 is necessary to schematically express an influence of the disturbance applied from the outside on the inertia model 153.

In addition, the transfer shaft inertia model 155 converts a torque command, to which the estimated disturbance is added, into a velocity with reference to a servo motor model, the compensator 158 adjusts a bandwidth as a compensation parameter of the disturbance observer 150, if the bandwidth is broadened, the estimated disturbance torque is estimated to be more quickly and more accurately close to actual disturbance torque, and thereby accuracy in calculation of the load inertia may be further improved.

In addition, the velocity sensor model 156 converts a deviation between an actual velocity v, which is calculated by the velocity subtractor 157, and an estimated velocity into torque, and provides the torque as an estimated disturbance. For example, the estimated disturbance is disturbance torque of the transfer shaft as an output of the disturbance observer 150, and the estimated disturbance is used to calculate the load inertia by the load inertia calculator 160.

Meanwhile, the aforementioned disturbance observer 150 is publicly known, and various disturbance observers 150 including matters suggested in Korean Patent No. 10-712558 and Korean Patent No. 10-185720 may be used.

However, the present disclosure is different from the related art in that because in the present disclosure, the disturbance estimation at the disturbance observer 150 is performed during a rapid transfer which may easily collect data and secure a sufficient time because of a high acceleration and deceleration time constant, the disturbance may be accurately estimated, which is similarly applied to an electric current applied to the servo motor 11 and a rotating angular velocity of the servo motor 11, which will be described below.

Figure 4:
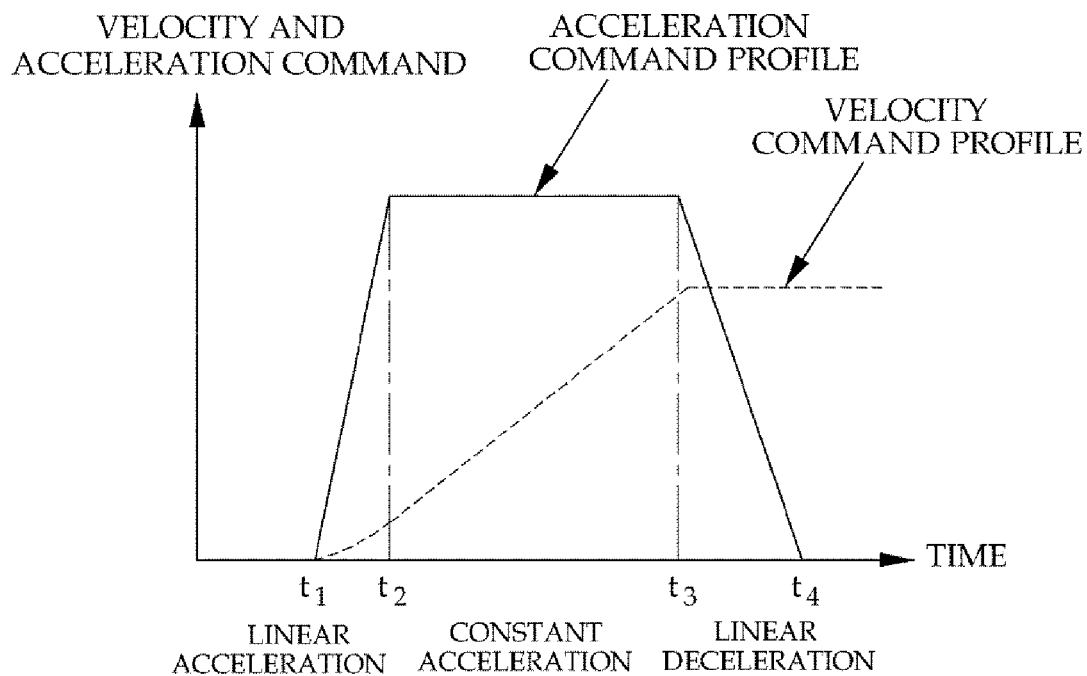
FIG. 4 is a view illustrating a load inertia estimation section of the real-time servo motor controller based on the load weight of the present disclosure.

In addition, as illustrated in FIG. 4, in the present disclosure, there is a difference in that an average value of disturbance torque, which is estimated for a period of time $t_2$ to $t_3$ when the servo motor 11 is driven at a constant acceleration, and estimated by the disturbance observer for this period of time $t_2$ to $t_3$, is used.

The reason is that not only an influence of a mechanical backlash may be removed by observing the disturbance when the transfer shaft is driven at a constant velocity, but also it is difficult for the disturbance observer 150 to accurately estimate actual disturbance torque because a high frequency band signal, which exceeds the bandwidth of the disturbance observer 150, may be included in a linear acceleration section $t_1$ to $t_2$ or a linear deceleration section $t_3$ to $t_4$.

The load inertia calculator 160 calculates inertia of the load, which is being transferred by the servo motor 11, by receiving an electric current applied to the servo motor 11, a rotating angular velocity of the servo motor 11, and an estimation disturbance value, and provides the inertia of the load to the control parameter provider 140.

Therefore, when the control parameter corresponding to the load inertia is provided to the servo controller 120 by the control parameter provider 140, the servo controller 120 may control the servo motor 11 in an optimum state in accordance with the load weight.

As publicly known, as the electric current (accurately, q-phase current: a current proportional to torque of a motor) applied to the servo motor 11 and the rotating angular velocity of the servo motor 11, values measured by using various sensors (not illustrated) provided in the servo motor 11 are used, as the estimation disturbance value, disturbance torque estimated by the disturbance observer 150 is used, and as a calculation equation for the load inertia, the following Equation 2 is used.

$$K_t^*(I_q+DTRQ)=(J_m+J_L)^*a_m \Leftrightarrow \int K_t^*(I_q+DTRQ)dt=(J_m+J_L)^*V_m \quad \text{[Equation 2]}$$

(Here, $K_t$ is a servo motor torque constant, $I_q$ is a q-phase current applied to the servo motor, DTQR is disturbance torque, $\alpha_m$ is rotating angular acceleration of the servo motor, $V_m$ is a rotating angular velocity of the servo motor, $J_m$ is servo motor inertia, and $J_L$ is load inertia seen from the motor)

In Equation 2, it may be known that because the integral of the whole left side is equal to the right side, any one of the rotating angular acceleration $\alpha_m$ of the servo motor or the rotating angular velocity $V_m$ of the servo motor may be used. That is, because the integral of acceleration is velocity, the left side equation is used when the acceleration is used, and the right side equation is used when the velocity is used.

Meanwhile, in Equation 2, the load inertia $J_L$ is a target value to be finally calculated, the servo motor torque constant $K_t$ and the servo motor inertia $J_m$ are already known as a constant and indicated in a specification of the servo motor provided by a manufacturer of the servo motor 11, and the electric current $I_q$ applied to the servo motor 11, the rotating angular acceleration $\alpha_m$, or the rotating angular velocity $V_m$ is a measured value which is measured by a sensor provided in the servo motor and provided to the load inertia calculator 160 through the servo amp 130 and the servo controller 120.

Therefore, in order to calculate the load inertia $J_L$ that is a target value through Equation 2, only the DTQR value, what is disturbance torque, needs to be obtained, the DTQR value is estimated and provided by the aforementioned disturbance observer 150, and therefore the load inertia may be calculated, and the calculated load inertia is outputted to the control parameter provider 140.

The servo controller 120 receives from the control parameter provider 140 the control parameter corresponding to the load inertia calculated by the load inertia calculator 160, and controls the servo motor 11 through the servo amp 130 in accordance with the inputted control parameter.

Of course, the servo controller 120 may receive various servo data including the electric current applied to the servo motor 11, the rotating velocity of the servo motor 11, or the like from the sensor provided in the servo motor 11, and may transmit the various servo data to the high level controller 110.

The high level controller 110 serves to perform a general control including calculation of the load inertia and adaptive adjustment of the servo controller 120 through the calculation of the control parameter, and a control algorithm used for the aforementioned control is stored in an application program memory 111.

The servo controller 120 controls the servo motor 11 by producing a torque command by using the control parameter adaptively adjusted by the high level controller 110 so that an optimum control is possible regardless of a load, and transmitting the torque command to the servo amp 130.

Hereinafter, an operational order of the real-time servo motor controller based on the load weight of the present disclosure, which is configured as described above, will be described with reference to the accompanying drawing.

Figure 5:
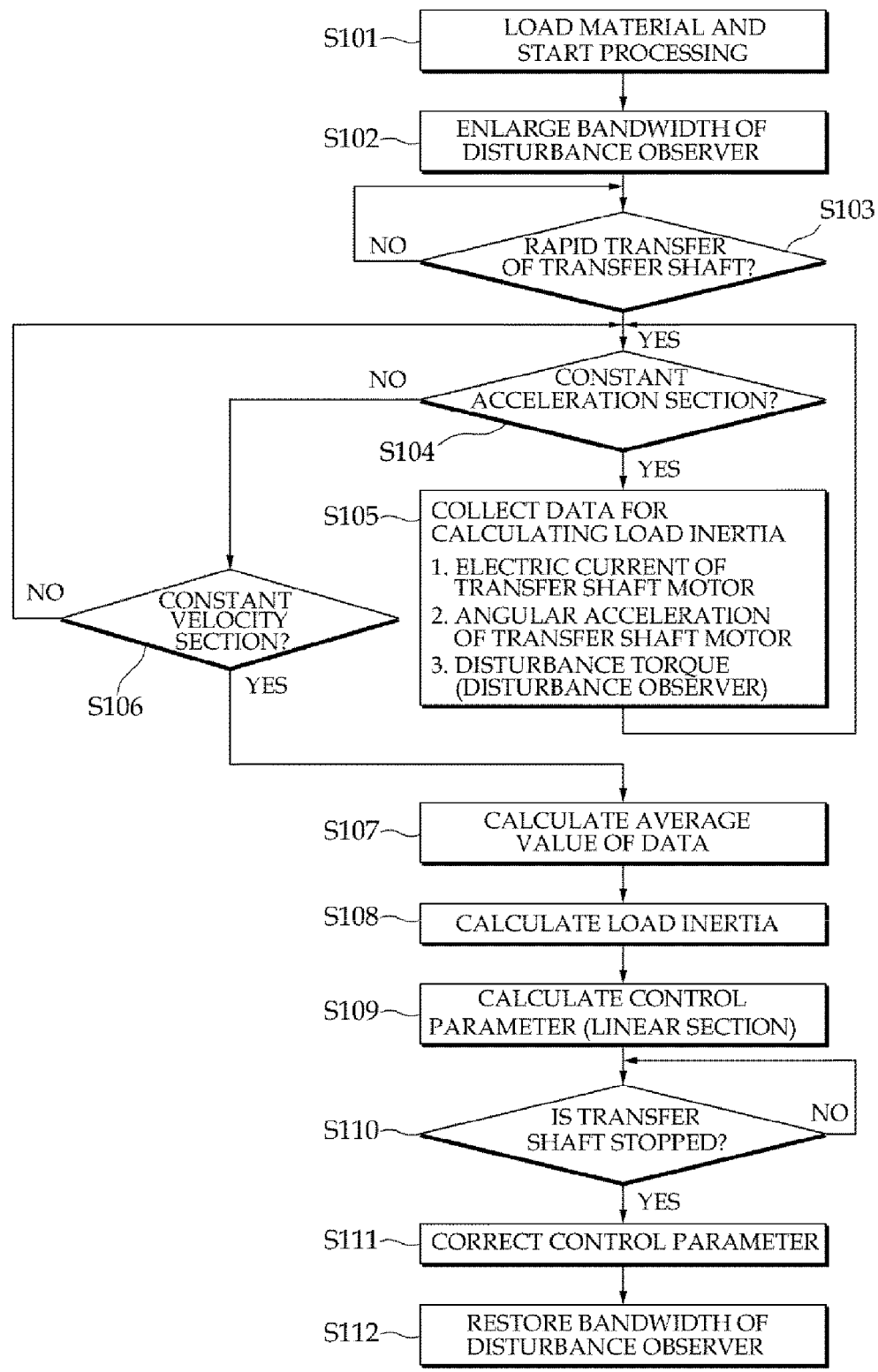
FIG. 5 is an operational flow chart of the real-time servo motor controller based on the load weight of the present disclosure.

FIG. 5 is an operational flow chart of the real-time servo motor controller based on the load weight of the present disclosure.

However, in FIG. 5, a step of measuring optimum control parameters for each of the loads for tests, which corresponds to representative weights, and storing the optimum control parameters in the look-up table 141 of the control parameter provider 140 is omitted, but the aforementioned step is performed in advance as described above.

As illustrated in FIG. 5, first, a material, that is, a load L is loaded on the work table 12 of the plant 10, and then a processing begins (S101).

When the processing begins, a parameter of the compensator 158 provided in the disturbance observer 150 is adjusted (S102). The adjustment of parameter of the compensator 158 is to enlarge the bandwidth, as described above.

When the parameter of the disturbance observer 150 is adjusted, whether the transfer shaft of the servo motor 11 is in a state of being rapidly transferred is monitored (S103). The rapid transfer means a velocity equal to or greater than a predetermined velocity which is affected by the load inertia, and may be changed in accordance with a weight of the load.

At this time, when the transfer shaft is not in a state of being rapidly transferred, the transfer shaft is continuously monitored until the transfer shaft is in a state of being rapidly transferred, and when the transfer shaft is in a state of being rapidly transferred, whether the transfer shaft is in a constant acceleration section is monitored (S104).

During the monitoring, when the transfer shaft is in a state of being rapidly transferred and in a constant acceleration section, data for calculating the load inertia are collected (S105). Values needed to calculate the load inertia include an electric current of a transfer shaft motor, angular acceleration of the transfer shaft motor, disturbance torque, and the like, and these values are stored as average values with respect to the overall constant acceleration section.

In contrast, when the transfer shaft is not in a constant acceleration section, whether the transfer shaft is in a constant velocity section is monitored (S106), when the transfer shaft is not in a constant velocity section, whether the transfer shaft is in a constant acceleration section is continuously monitored, and when the transfer shaft is in a constant velocity section, average values of the disturbance torque and the servo data, which are collected in the constant acceleration section and needed to calculate the load inertia, are calculated (S107).

Because a velocity is constant in the constant velocity section, the load inertia due to a load is not applied, and therefore the disturbance torque and the servo data, which are needed to calculate loads, are collected only in the acceleration section.

When the average values of the values collected in the constant acceleration section are calculated, the load inertia calculator 160 calculates the load inertia (S108) by inputting the averaged values of the disturbance torque, the electric current, the rotating angular acceleration, and the like into Equation 2, and then outputs the calculated load inertia to the control parameter provider 140.

Then, the control parameter provider 140 calculates the control parameter corresponding to the calculated load inertia. However, in a case in which a load inertia value, which is not stored in the look-up table 141, is calculated, an appropriate control parameter is calculated by using a linear interpolation method.

Then, whether the transfer shaft of the servo motor 11 is stopped is monitored (S110), when the transfer shaft is stopped, the control parameter of the servo controller 120 is corrected into the control parameter calculated as described above (S111), and a control process is ended by restoring the bandwidth of the disturbance observer 150 (S112).

After the process is ended, an optimum control for the plant 100 is performed by the control parameter which is adaptively adjusted in accordance with the weight of the material and the servo controller 120.

As described above, specific embodiments of the present disclosure have been described. However, the spirit and scope of the present disclosure are not limited to the specific embodiments, and it will be understood by those skilled in the art that various modifications and changes may be made without departing from the scope of the subject matter of the present disclosure.

Therefore, the aforementioned embodiments are provided to completely inform the scope of the present disclosure to those skilled in the art, the described embodiments should be considered in all respects as illustrative only and not restrictive, and the present disclosure is defined only by the scope of the appended claims.

The real-time servo motor controller based on the load weight of the present disclosure may be used in the servo motor controller which may control the servo motor in an optimum state regardless of the load weight.

Although the present disclosure has been described with reference to exemplary and preferred embodiments, workers skilled in the art will recognize that changes may be made in form and detail without departing from the spirit and scope of the disclosure.

The invention claimed is:

1. A real-time servo motor controller based on a load weight, comprising:
    a control parameter provider which respectively stores control parameters for controlling a servo motor, which are optimized by using data measured while transferring loads (materials) for tests, respectively, which have different weights, and then provides the control parameter corresponding to load inertia estimated in real time when a plant is actually operated;
    a disturbance observer which estimates in real time disturbance including frictional torque, which is generated while transferring the load;
    a load inertia calculator which calculates inertia of the load, which is being transferred by the servo motor, by receiving a measured value of an electric current applied to the servo motor, a measured value of a rotating angular velocity of the servo motor, and an estimation disturbance value estimated by the disturbance observer, and outputs the calculated load inertia value to the control parameter provider;
    a servo controller which receives from the control parameter provider the control parameter corresponding to the load inertia outputted by the load inertia calculator, and controls the servo motor by using the inputted control parameter; and
    a high level controller which performs calculation of the load inertia and a control algorithm of the servo controller through the control parameter.

2. The real-time servo motor controller based on a load weight of claim 1, wherein the control parameter provider stores the tested control parameter in a look-up table for each load inertia according to a weight of each load, and provides the control parameter by linearly interpolating two control parameter values which are adjacent to each other among the control parameter values stored in the look-up table.

3. The real-time servo motor controller based on a load weight of claim 1, wherein the load inertia calculator 160 calculates the load inertia in real time by using the following Equation 2, $$K_t*(I_q+DTRQ)=(J_m+J_L)*a_m \Leftrightarrow \int K_t*(I_q+DTRQ)dt= (J_m+J_L)*V_m \quad [\text{Equation 2}]$$

(Here, $K_t$ is a servo motor torque constant, $I_q$ is a q-phase current applied to the servo motor, DTQR is disturbance, $\alpha_m$ is rotating angular acceleration of the servo motor, $V_m$ is a rotating angular velocity of the servo motor, $J_m$ is servo motor inertia, and $J_L$ is load inertia seen from the motor), and outputs the calculated load inertia to the control parameter provider.

4. The real-time servo motor controller-based on a load weight of claim 1, wherein the control parameter, the disturbance, and the load inertia are estimated by values measured while the load is transferred by the servo motor at constant acceleration.

5. The real-time servo motor controller based on a load weight of claim 2, wherein the control parameter, the disturbance, and the load inertia are estimated by values measured while the load is transferred by the servo motor at constant acceleration.

6. The real-time servo motor controller based on a load weight of claim 3, wherein the control parameter, the disturbance, and the load inertia are estimated by values measured while the load is transferred by the servo motor at constant acceleration.

* * * * *